United States Patent [19]
Degen et al.

[11] Patent Number: 5,591,539
[45] Date of Patent: Jan. 7, 1997

[54] ELECTROLYTICALLY CONDUCTIVE BATTERY SEPARATOR POLYMERIC FILM

[75] Inventors: Peter J. Degen, Huntington; Joseph Y. Lee, South Setauket, both of N.Y.

[73] Assignee: Pall Corporation, East Hills, N.Y.

[21] Appl. No.: 46,654

[22] Filed: Apr. 13, 1993

[51] Int. Cl.$^6$ ................................................ H01M 2/16
[52] U.S. Cl. ........................ 429/144; 429/254; 428/507
[58] Field of Search ............................... 429/142, 144, 429/249, 250, 254, 255; 428/421, 507

[56] References Cited

U.S. PATENT DOCUMENTS

| | | |
|---|---|---|
| 3,427,206 | 2/1969 | Scardaville et al. . |
| 3,985,580 | 10/1976 | Cogliano . |
| 4,110,143 | 8/1978 | Cogliano et al. . |
| 4,201,641 | 5/1980 | Gotoda et al. . |
| 4,230,549 | 10/1980 | D'Agostino et al. . |
| 4,273,840 | 6/1981 | Machi et al. . |
| 4,283,442 | 8/1981 | Machi et al. ............ 429/249 X |
| 4,339,473 | 7/1982 | D'Agostino et al. . |
| 4,804,598 | 2/1989 | Jackovitz et al. . |
| 5,017,458 | 5/1991 | Soda et al. . |

FOREIGN PATENT DOCUMENTS

| | | |
|---|---|---|
| 0547237 | 6/1993 | European Pat. Off. . |
| 5-234578 | 9/1993 | Japan . |
| 5-258741 | 10/1993 | Japan . |
| 5-290822 | 11/1993 | Japan . |
| 2213630 | 8/1989 | United Kingdom . |

OTHER PUBLICATIONS

Patent Abstracts of Japan, vol. 6, No. 154 (C-119) (JP-A-57 073 027).
WPI Abstract Accession No. 82-48934E (JP-A-57 073 027).
WPI Abstract Accession No. 82-48934E/42 (JP 57073027).
WPI Abstract Accession No. 68-81099P/00 (DD 52815A).
WPI Abstract Accession No. 79-2664B/14 (JP 54025432).
WPI Abstract Accession No. 76-40701X/22 (JP 51042935).
D'Agostino et al., "Grafted Membranes" (RAI Research Corp.) Date not available.

*Primary Examiner*—Anthony Skapars
*Attorney, Agent, or Firm*—Leydig, Voit & Mayer, Ltd.

[57] ABSTRACT

A method for making an electrolytically conductive battery separator polyethylene film for alkaline battery applications is disclosed which comprises carrying out the grafting reaction in an environment free of air and comprising a pressurized inert gas blanket. The resulting lots of polyethylene film are capable of being made with the range of electrolytic resistance values required for a variety of alkaline battery applications, while exhibiting highly uniform electrolytic resistance characteristics.

10 Claims, 3 Drawing Sheets

ELECTROLYTICALLY CONDUCTIVE BATTERY SEPARATOR POLYMERIC FILM

TECHNICAL FIELD OF THE INVENTION

The present invention pertains to electrolytically conductive polymeric films and to battery separators made from such electrolytically conductive films. In particular, the present invention is concerned with a more facile method for making electrolytically conductive polyethylene films and to battery separators made from such films which are characterized by highly uniform electrolytic resistance properties.

BACKGROUND OF THE INVENTION

A wide range of products, from consumer electronics to battery-powered electric vehicles, utilize electrochemical energy sources. Similarly, there is a wide range of primary and secondary alkaline batteries that have been proposed and/or used for these varying applications. As representative examples, there can be listed the following electrochemical systems: AgO/Zn, $Ag_2O/Zn$, HgO/Zn, HgO/Cd, Ni/Zn, Ni/Cd and Zn/air systems.

It is known that the battery separator for such electrochemical systems must possess a variety of characteristics. A principal requirement is that the electrolyte resistance characteristics should be uniform. Indeed, ideally, any particular lot of the separator material should exhibit zero variation in electrolytic resistance characteristics.

When the distribution of the electrolytic resistance is non-uniform within a given lot or quantity of the separator film (e.g., roll), cells and batteries utilizing separators made from such non-uniform lot will have variable and unpredictable electrical performance characteristics. More particularly, such non-uniform separators will result in variable current and voltage performance from battery to battery. Such non-uniform and variable performance creates substantial problems for the battery manufacturer and for the user of the battery as well. For example, a separator having a higher-than-specific resistance area will give a lower closed circuit voltage and a lower capacity than the specification for the cell or battery. Using such a separator might also result in cells or batteries that cannot meet the low temperature and high rate performance specifications set for such cells or batteries.

Considerable effort has been directed over many years to developing materials that satisfy the stringent and varied requirements for separators for electrochemical systems such as for those previously identified. In addition to the desired electrolytic resistance characteristics, the separator material must allow satisfactory cycle life and provide adequate shelf life. The separator material must have satisfactory resistance to chemical oxidation, and, depending upon the electrochemical system involved, appropriate retardation of silver and mercury ion diffusion, and adequate retardation of zinc dendrite growth.

Over the course of at least the last 20 years or so, one type of separators that have been utilized for alkaline batteries include polyethylene, polypropylene and polytetrafluoroethylene-based electrolytically conductive films. The base films, particularly polyethylene, have excellent oxidation resistance and superior chemical stability in alkali. Appropriate electrolytic resistance and hydrophilic properties have been achieved by modification of the base film using gamma radiation grafting techniques. Separators of this type have also been used for many years which are radiation crosslinked to further alter the characteristics of the base film.

There has also been substantial attention over this same 20-year time period that has been directed to examining the manner in which such radiation-grafted, electrolytically conductive polymeric films have been prepared. Seemingly, every aspect of making this type of film has been examined, as well as the effect on the performance of such films as battery separators.

Prior researchers have thus stated that the order of performing the two operations of grafting and crosslinking is important. Although it is easier to graft first and then to crosslink, test results, it is concluded, have indicated that a preferred film is made by crosslinking first, then grafting.

It has been stated that the molecular properties of the base resin or film which are important in making the films include the crystallinity, the molecular weight distribution and the absence of low molecular weight fractions. Low density polyethylenes have been preferred for many applications. It has also been shown that, with such low density polyethylenes, the cycle life of the grafted film increases as the crosslinking dose is increased. It has likewise been proposed that the cycle life at a high crosslinking dose appears to be related to the properties of the base resin.

It has been further noted that highly crosslinked grafted films swell much less than the identically grafted films which are not crosslinked and that highly cross-linked films are more difficult to graft. It has also been stated that the use of methacrylic acid as a graft monomer gives better cycle life than the use of an acrylic acid graft.

At one time, it was thought that polymeric films with low graft levels would have higher resistance but would have a greater cycle life than high graft level films, due to the decreased permeability to ions such as zinc and the like in the low graft films. Some test data, however, has caused some prior researchers to conclude that high graft films prepared from radiation crosslinked polyethylene are superior to other graft copolymer films.

Prior researchers have also opined that, during the grafting process, homopolymerization of the monomeric material used for grafting can take place and that such homopolymerization is undesirable, both for processing as well as product reasons (i.e., a lack of uniform grafting). One prior solution suggests introducing air into the grafting solution to tie up the free radicals formed during irradiation, thereby inhibiting the homopolymerization process. When a non-crosslinked base film is used with a methylene chloride solvent system for the monomeric grafting material, it has been suggested to include a chemical inhibitor, in addition to air, into the grafting solution.

Another prior solution to the homopolymerization problem suggests, when preparing a separator film from a polyethylene film using acrylic acid in water as the grafting monomer, the addition of a ferrous or cupric salt in an amount to inhibit the formation of a homopolymer of acrylic acid in the solution surrounding the polyethylene film to thereby help achieve a uniform graft reaction in the polyethylene film.

Despite all of this considerable effort in analyzing and testing this type of electrically conductive polymeric films over at least the last 20 years, the uniformity of the electrolytic resistance properties in a lot of such separator material is substantially less than is desired. Indeed, as previously noted, the problems caused by this lack of sufficiently uniform electrolytic resistance characteristics are substantial. Cells using non-uniform separators will have greatly varied closed circuit voltages which will affect the rate capabilities and yield non-uniform energy capacities.

There accordingly exists the need for both a more efficient method for making battery separators from electrolytically conductive polyethylene films as well as lots of such films that are characterized by significantly more uniform electrolytic resistance characteristics within the lot and from lot-to-lot. More particularly, to avoid the performance problems that may result from cell-to-cell when a non-uniform lot of polyethylene separator film is used, there exists a need for separator film lots that can be made having the general range of electrolytic resistance desired for the specific applications, yet which possess highly uniform electrolytic resistance values within the range desired.

As one example, many applications require polyethylene separator films having extremely low electrolytic resistance values (when measured in 40% KOH at 1000 Hz at 23° C.), desirably within the range of 100 to 250 m$\Omega$-cm$^2$ (an average of 160 m$\Omega$-cm$^2$). Prior art methods cannot even consistently achieve lots of such separator films having electrolytic resistance values within the specified 100 to 250 m$\Omega$-cm$^2$ range, much less the desired highly uniform resistance values within the specified range.

It is therefore an object of the present invention to provide electrolytically conductive polyethylene films for use as battery separators which are characterized by highly uniform electrolytic resistance characteristics. It is also an object of this invention to provide a more facile method for making such films.

These and other objects and advantages of the present invention, as well as additional inventive features, will be apparent from the description of the invention provided herein.

BRIEF SUMMARY OF THE INVENTION

The present invention involves a method of radiation grafting acrylic or methacrylic acid onto a polyethylene film in such a fashion as to provide a lot of such film (e.g., a roll) having highly uniform electrolytic resistance characteristics in a desired range within that lot as well as from one lot to another. In accordance with this invention, the radiation grafting is carried out in an environment from which air has been removed and an inert gas blanket provided. The resulting film lot exhibits highly uniform electrolytic resistance characteristics.

DESCRIPTION OF THE PREFERRED EMBODIMENTS

Figure 1:
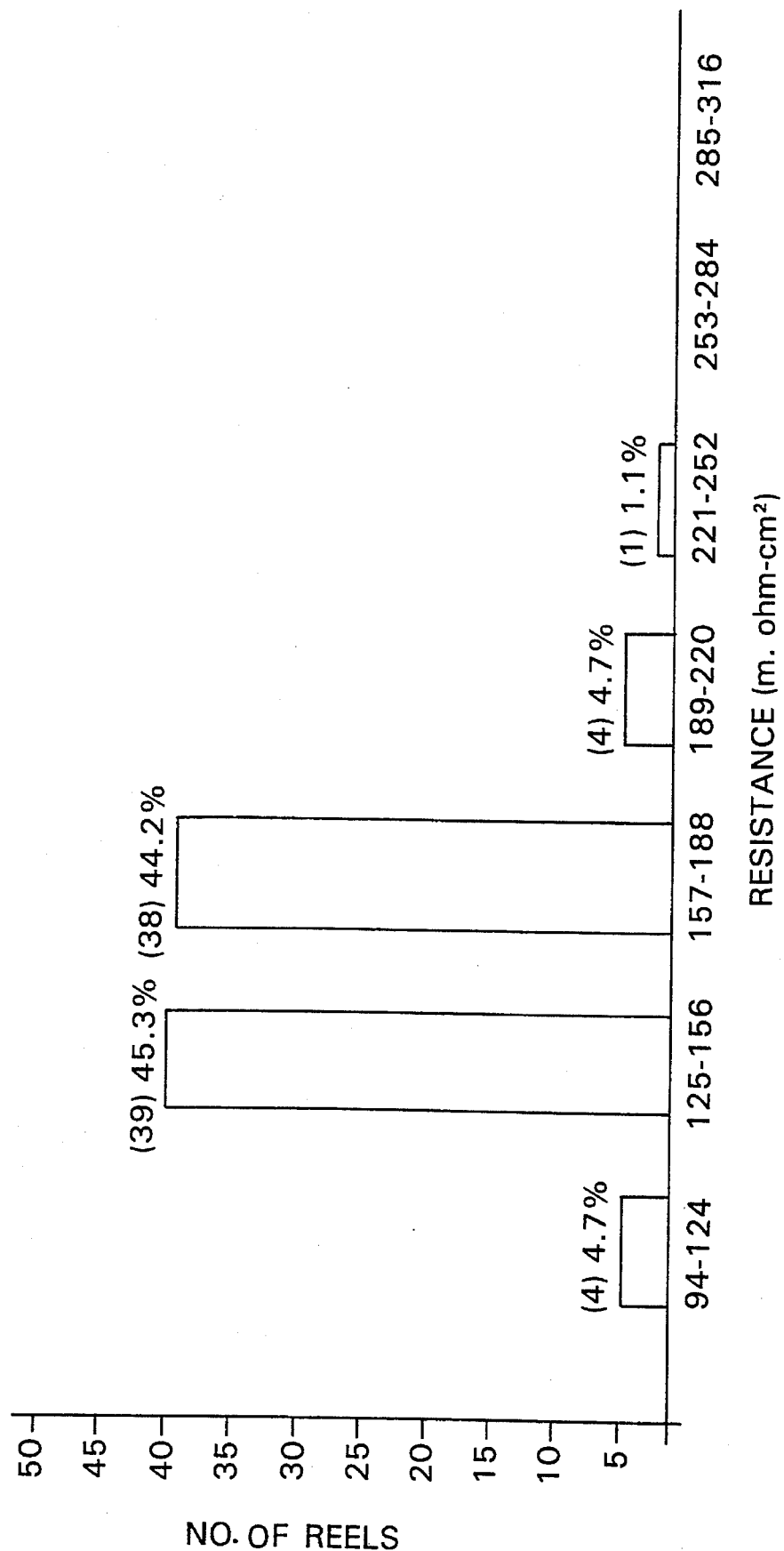
FIG. 1 is a bar graph showing the highly uniform electrolytic resistance distribution characteristics achieved using the method of the present invention.

The base film from which the electrolytically conductive separator film of the present invention is made comprises polyethylene. The thickness of the film can vary as desired for the particular electrochemical application. However, it will be generally useful to utilize a film having a thickness of from about 0.5 to about 5 mils, preferably from about 0.5 to about 3 mils. As illustrative examples of useful base films, it has been found useful to utilize low density polyethylenes having a density of from 0.90 to 0.94 grams per cm$^3$.

In the more preferred embodiment, the polyethylene base film is crosslinked. Crosslinking increases the dimensional and thermal stability of the separator film as well as other separator properties as is known. The extent to which the base film is crosslinked can be varied as needed to provide the desired dimensional and thermal stability (or other properties imparted by crosslinking) for the particular battery application. Suitable crosslinking can be carried out by electron beam radiation as is known. As an illustrative example, it will be suitable to utilize a total dosage of 75 to 100 Mrads.

While it is preferred to carry out the crosslinking step first, it is also satisfactory to carry out the crosslinking after grafting the desired monomer to the base film. If this latter sequence is used, care should be taken to remove any water present following washing after grafting. Indeed, it is also possible to carry out both the crosslinking and grafting at the same time. However, simultaneous crosslinking and grafting may prevent the use of the preferred dosage level for crosslinking, as the use of the preferred dosage level could adversely affect the desired grafting reaction.

The graft monomers employed in this invention comprise either acrylic or methacrylic acid present in a solvent in an amount of from about 10 to 50% by weight. While toluene is the desired solvent, other solvents such as chlorinated hydrocarbons (e.g., chloroform, dichloroethylene, 1,1,1- or 1,1,2-trichloroethane and methylene chloride) may be used. In general, any halogenated hydrocarbon which is a solvent for the selected graft monomer and does not dissolve the base film may be utilized.

To carry out the grafting step, the polyethylene film is placed in appropriate contact with the selected grafting monomer solution and then subjected to high energy ionizing radiation (e.g., gamma radiation) at a dose rate and for a time sufficient to complete the desired extent of grafting. Suitable exposure rates and times for the radiation grafting reaction are known. The extent of grafting will be determined by the general level of electrolytic resistance desired for the particular battery application. As is known, the electrolytic resistance decreases as the extent of grafting increases. In addition, it will be generally more desirable to utilize a separator having the highest resistance that meets the maximum drain rate required for the application since higher electrolytic resistances tend to improve the shelf life of the battery.

The low density polyethylene base film utilized is commercially available in roll form. The linear footage on such rolls can vary widely, from about 100 to about 2000. Likewise, the width dimension of rolls used to make battery separators can vary but will generally range from 1 inch to about 48 inches.

Any method for contacting the graft monomer solution with the base film can be used which will result in the desired grafting efficiency. An illustrative and preferred method comprises unrolling the base film roll and then re-rolling while interleaving an absorbent material capable of taking up the graft monomer solution in an amount adequate to effect the desired extent of grafting. Thus, in the interleaved roll, adjacent layers of the film are separated by a layer of absorbent material. Any absorbent material may be utilized. It has been found suitable to use an absorbent layer having a thickness of from about 5 to 15 mils, preferably 8 mils or so. Illustrative examples of suitable absorbent layers include absorbent paper (BP280, available from Kimberly-Clark Corporation) and a non-woven polyester (Reemay 2200, Midwest Filtration).

The interleaved polyethylene base film and absorbent layer roll are then placed into a canister or container filled with the grafting monomer solution. The bulk roll is then placed into the canister and allowed to slowly sink as the absorbent layer absorbs the grafting solution. Alternatively, depending upon the solvent, it may be necessary to first soak the absorbent layer with the grafting solution. In either technique, the canister is filled with grafting solution to the desired height.

In accordance with a principal aspect of the present invention, the grafting reaction is carried out in the absence of air. It has been found that lots of the separator film made in this fashion exhibit surprisingly highly uniform electrolytic resistance uniformity characteristics, as will be more fully discussed hereinafter. The advantages to both the separator film and battery manufacturer are substantial.

To this end, in the preferred embodiment of the present invention, the canister filled with the desired grafting solution is then, prior to the radiation grafting reaction, subjected to a processing regime which causes the absorbent layer to absorb adequate graft monomer solution for the grafting step, removes the air from the roll and the canister and provides a pressurized inert gas blanket under which the grafting reaction is carried out. More particularly, the preferred method of the present invention involves placing the interleaved roll in a canister, filling the canister with graft monomer solution, and then allowing enough time (e.g., 16 hours or more) for equilibration. Vacuum is then applied (e.g., for 30 minutes) to remove air from the canister and the roll. Additional monomer is added so the top of the roll is under the grafting solution level. Vacuum is then again applied (e.g., 30 minutes). After allowing the roll to equilibrate (e.g., 16 hours or more), the free (i.e., unabsorbed) graft monomer solution is then removed, as by pumping, from the canister. Vacuum is then applied, followed by a flush with an inert gas (e.g., nitrogen), and this vacuum and flush regime may be repeated, at least two or three cycles being desired. The canister is then pressurized with an inert gas (e.g., nitrogen at 6 psig).

The thus-pressurized canister can then be irradiated at a dosage rate and for a time sufficient to graft the monomer present to the base film. This may be suitably carried out by placing the canister in a Cobalt 60 radiation vault. Exposure to Cobalt 60, which, as is known, emits gamma radiation, for an exposure of from 0.1 to 5 Mrad, preferably 0.2 Mrad, should be sufficient to graft the monomer to the base film. The particular dosage levels can, of course, be varied as necessary to effect the desired extent of grafting.

Following completion of the grafting reaction, the bulk roll may then be unwound, and the resulting separator film run through a suitable bath to leach out toluene or any other flammable material used as the solvent. The absorbent layer may be run through a water bath, rolled (if desired) and then discarded.

Following the removal of the solvent, the separator film is passed through a wash regime to remove residues such as gel material, polymer, monomer and the like. It has been found suitable to first pass the resulting film through boiling water, followed by a boiling solution of 4% potassium hydroxide and then rinse water. The residence time of the film in each bath may vary as desired. Residence times of from 30 seconds to 10 minutes, with a time of about 3 minutes being preferred, may be employed.

Utilizing a potassium hydroxide solution converts the grafted monomer acid group to a potassium salt, aiding in lowering the resistance of the separator film. While the concentration of potassium hydroxide can vary, it has been found that a 4% aqueous solution provides an optimum concentration.

It is also preferred for some applications to contact the film with an appropriate emulsifier so as to lower the electrolytic resistance of the film as well as to impart enhanced wetting characteristics without adversely affecting the chemical stability. This may be accomplished by passing the film through an emulsifying solution after or during the last wash.

Suitable emulsifiers of the anionic, cationic and non-ionic types are known and may be used, depending upon what is desired for the particular application. Exemplary anionic emulsifiers include the carboxylic acid salts, sulfonic acid esters, alkane sulfonates, alkylaryl sulfonates and the like. Cationic emulsifiers include quaternary nitrogen salts, non-quaternary nitrogen bases and the like. Exemplary non-ionic emulsifiers include the ethylene oxide derivatives having long chain alkyl groups, polyhydroxy esters of sugar alcohols and amphoteric surfactants. A specific example of non-ionic emulsifiers is an isooctyl phenoxyl polyethoxy ethanol (Triton X100, Rohm and Haas). A specific example of an anionic emulsifier is a sodium salt of alkylaryl polyether sulfonate (Triton X200, Rohm and Haas). An illustrative example of a cationic emulsifier is a stearyldimethylbenzyl ammonium chloride (Triton X400, Rohm and Haas).

The residence time of the polyethylene film in the emulsifier solution may vary within wide limits, i.e., from a few seconds to 5 minutes or more, but may preferably be from 1 to 3 minutes. Ambient temperatures or elevated temperatures from 80° to 90° C. are suitable. Concentrations of 1 to 2% of the appropriate emulsifier in water may be employed, as may greater amounts if desired.

The polyethylene film may then be dried and thereafter combined with other materials to satisfy the requirements of a specific electrochemical application. Thus, the electrolytically conductive polyethylene battery separator films of the present invention may be laminated with a layer of cellophane to provide a composite separator material having enhanced strength as well as increased retardation of the migration of soluble silver oxides. In another application, the polyethylene separator film of the present invention may be combined with a layer of cellophane and an absorber material to provide the separator system for applications such as a zinc-silver oxide button cell. Another desirable composite separator comprises a central layer of cellophane and outer layers of the polyethylene separator film of this invention. Indeed, as may be appreciated, the polyethylene separator film of the present invention can be used as a component to form a composite separator, employing whatever other components may be required for a particular application.

The lots of the electrolytically conductive polyethylene separator film of the present invention are characterized by highly uniform electrolytic resistance characteristics in contrast to the non-uniform characteristics of prior materials of this type. The advantages are substantial. This allows the battery manufacturer the certainty that the desired and specified performance will be consistently provided. More particularly, the battery manufacturer can be sure that, when lots of the battery separator film of the present invention are used, the resulting cells or batteries will provide energy capacity and other electrochemical performance characteristics that are consistent from one cell to another.

The uniformity of the electrolytic resistance characteristics of the battery separator films of the present invention is determined by testing at selected locations within a lot and then comparing the electrolytic resistance values found to assess the relative distribution. More particularly, as used herein, the relative uniformity in electrolytic resistance characteristics is defined by a uniformity index. The uniformity index for a given lot of the battery separator film of this invention thus comprises one-half of the spread between the maximum and minimum values determined from eight samples taken equidistantly along the lineal length of the lot of the battery separator film. Each sample can be taken anywhere across the width.

Further, as to the uniformity index test protocol, eight samples are required since this number will be adequate to provide statistically meaningful data. Selecting the samples equidistantly along the lineal length of the lot (e.g., typically a roll) achieves sampling at defined points representative of the length of material involved. Lastly, since the sample can be taken anywhere across the width dimension, a dimension of randomness is achieved.

The present invention thus achieves lots of the separator films which have electrolytic resistance characteristics within the ranges desired for various battery applications so as to satisfy the desired drain rate and other requirements, yet which possess electrolytic resistance characteristics within such ranges that are highly uniform as determined by the uniformity index within a given lot as well as from lot-to-lot. Thus, crosslinked, low density polyethylene separator films can be provided with electrolytic resistances (when measured in 40% KOH at 1000 Hz at 23° C.) in the range of from 100 to 250 m$\Omega$-cm$^2$, with an average at 160 m$\Omega$-cm$^2$, and a uniformity index of no more than 50 m$\Omega$-cm$^2$, preferably no more than 40 m$\Omega$-cm$^2$, and even more preferably, no more than 35 m$\Omega$-cm$^2$.

For applications allowing somewhat higher electrolytic resistance characteristics, lots of polyethylene separator films can be provided with resistances in the range of 180 to 260 m$\Omega$-cm$^2$ with an average at 220 m$\Omega$-cm$^2$. Such lots can be obtained with a uniformity index of no more than 70 m$\Omega$-cm$^2$, preferably no more than 50 m$\Omega$-cm$^2$.

When separators with even higher electrolytic resistances can be employed, the present invention provides polyethylene films with resistances in the range of 220 to 500 m$\Omega$-cm$^2$, with an average of 360 m$\Omega$-cm$^2$. Lots of separator films of this type can be prepared pursuant to the present invention with a uniformity index of no more than 140 m$\Omega$-cm$^2$, preferably no more than 100 m$\Omega$-cm$^2$.

When laminates are formed with cellophane and the separator films of this invention having the low range of electrolytic resistance, lots of composite bilaminate separators can be provided having electrolytic resistances in the range of 160 to 310 m$\Omega$-cm$^2$ and with a uniformity index of no more than 70 m$\Omega$-cm$^2$, preferably no more than 50 m$\Omega$-cm$^2$. Lots of a trilaminate separator (central layer cellophane and outer layers of the low electrolytic resistance range films) can be prepared pursuant to this invention which exhibit electrolytic resistances in the range of 260 to 560 m$\Omega$-cm$^2$ and a uniformity index of no more than 90 m$\Omega$-cm$^2$, preferably no more than 70 m$\Omega$-cm$^2$.

The battery separator films of the present invention are generally used by battery manufacturers in either roll or reel form. As to the latter, rolls are cut into suitable widths (e.g., ½ to 1 inch or so) for use in the intended application. The uniformity of the battery separator films of the present invention is such that an extremely tight range of electrolytic resistance values is achieved within a given reel, from reel to reel, and from roll to roll.

This level of uniformity not only insures that the separator will not cause non-uniform electrical performance in the intended application, but also allows considerable flexibility on the part of the battery separator film manufacturer. The method of the present invention thus achieves excellent reproducibility of performance so that the resulting separator film rolls, and reels made therefrom, can be interchangeably used, all having a tight range of electrolytic resistance values as determined by the uniformity index.

Indeed, although the uniformity index can be determined on every roll or reel if desired, it will be satisfactory from a quality control standpoint to simply take a few samples (e.g., six) within the first five or six feet of the roll or reel. Such sampling will insure that the desired range of electrolytic resistance was in fact achieved by the production method utilized. That the process was properly carried out will likewise be evidenced by the tight range of electrolytic resistance values determined without the need to determine the uniformity index for the roll or reel.

The polyethylene battery separator films of the present invention also exhibit excellent oxidation stability (e.g., in a saturated AgO solution in 40% KOH at 100° C.). Thus, even when exposed to such testing conditions for 48 hours, there should be no significant change in the electrolytic resistance characteristics (i.e., no change that will take the electrical resistance value outside the uniformity index value for the selected separator application).

The following Examples further illustrate the present invention, but, of course, should not be construed as in any way limiting its scope. Unless otherwise indicated, all percentages are by weight. The electrolytic resistance values set forth herein and in the following Examples were determined using a commercially available RAI AC Milliohm Resistance Meter Model 2401. The conductivity test cell used consisted of two heavy gauge square platinum electrodes, 1.00 cm. on a side mounted parallel and 0.25 cm. apart in a Lucite holder. The electrodes were coated electrolytically with a heavy deposit of platinum black (i.e., the electrodes were platinized). The fine granular platinum black deposit causes a large increase in the electrode surface area, leading to an increase in double layer capacitance. After the resistance meter has been turned on, the meter is allowed to warm up for at least 30 minutes. The test cell is equilibrated in 40% KOH aqueous solution for 24 hours. The cell electrodes should be completely immersed in the electrolyte. The leads of the test cell are connected to the resistance meter at the test cell outlets. The calibration screw is adjusted so that the meter reads 1000. The beaker in which the test cell is positioned is placed in an environment (i.e., a constant temperature water bath) to maintain a temperature of 23° C. A shim with a 1 cm$^2$ cut-out window is separated, the test separator film pre-cut to the size of the window is centered over the opening of one face, and the shim is then clamped together. The shim is placed in the electrolyte for soaking for 60 minutes. After the necessary soaking time, the shim is put into the test cell; and the reference reading checked to make sure that it is 1000. The shim with the test separator film should be free of air bubbles. The remote control switch on the meter is then depressed and the measurement read and recorded. Thereafter, a corresponding shim without the test separator film is put into the cell, and the cell resistance is read and recorded with the blank shim in place. Again, it should be ensured that air bubbles do not interfere with the reading. The electrolytic resistance of the test separator film is then the difference between the resistance values determined, i.e., the value with and without the test separator film.

EXAMPLES 1–4

Rolls of separator films were prepared in accordance with the method of the present invention in the low electrolytic resistance range.

Separator films were thus prepared using a crosslinked 90 Mrad low density polyethylene (density of 0.925 gm/cm.$^3$ and thickness of 1.1 mils) and a grafting solution, by weight, of 36% methacrylic acid, 0.008% ethylene glycol dimethacrylate and 63.992% toluene.

An interleaved roll of the crosslinked polyethylene film and a paper layer (BP280, Kimberly-Clark Corporation) was prepared, placed in a canister and then soaked in the grafting solution. The roll was evacuated for 2×30 minutes, and the solution was pumped out from the canister.

The canister was again evacuated for 10 minutes and then pressurized with dry nitrogen to 6 psig. The canister was then exposed to gamma radiation from a Cobalt 60 source at a dose rate of 7000 rad/hour for 22 hours (a total dose of 0.154 Mrad).

The polyethylene film was then stripped off the paper interleaf, and the grafted film washed through two tanks of hot water, a tank of hot caustic at 4% KOH and two hot tanks of emulsifiers, all kept at 95° to 100° C. The emulsifier used was one percent isooctyl phenoxyl polyethoxy ethanol (Triton X100, Rohm and Haas) and one percent sodium dodecyclbenzene sulfonate (KX, Witco Chemical) in water. The film was thereafter dried.

Four rolls were prepared using this same procedure and then tested for their electrolytic resistance uniformity, each of the samples being taken from the first few feet of the roll. The results are set forth in Table 1:

TABLE 1

| Example | Electrolytic Resistance - mΩ-cm$^2$ |
|---|---|
| 1 | 179,169,181,180,168,159 |
| 2 | 153,136,165,159,133,122 |
| 3 | 160,164,161,150,165,151 |
| 4 | 145,150,171,148,151,140 |

As can be seen, the each of the separator film rolls possess the highly uniform electrolytic resistance properties characteristic of the battery separator films of this invention, not only within each roll, but also from roll to roll.

EXAMPLES 5–8

(Comparative Examples)

Battery separators were prepared using a prior art process to show the electrolytic resistance uniformity that previously could be achieved.

Battery separators were made using rolls of the crosslinked 90 Mrad low density polyethylene used in Examples 1–4 as well as the paper interleaf employed. The grafting solution comprised 34% methacrylic acid, 4% t-butyl alcohol and 62% toluene. The roll was placed in a canister partially filled with the graft monomer solution. Additional monomer solution was then added, and the canister was evacuated for 1 hour. The canister was opened to atmosphere, and a plastic cover was clamped without special care to remove air from the canister.

The canister was irradiated using a Cobalt 60 source at a dose rate of 6600 rad/hour for 55 hours (a total dose of 0.36 Mrad). The roll then was stripped off of the paper interleaf; and the roll was washed in two tanks of hot water, one tank of hot caustic (4% KOH), and two tanks of emulsifier all at 95°–100° C. The emulsifier was as used in Examples 1–4. The roll was thereafter dried.

The same procedure was utilized for preparing four different rolls, and the electrolytic resistance characteristics of these rolls were thereafter tested as described in Examples 1–4. The results are shown in Table 2:

TABLE 2

| Example | Electrolytic Resistance - mΩ-cm$^2$ |
|---|---|
| 5 | 176,218,258,247,249,249 |
| 6 | 190,281,300,257,337,295 |
| 7 | 116,110,118,146,146,116 |
| 8 | 193,279,199,310,142,134 |

As can be seen, the distribution of the electrolytic resistance values is non-uniform, both within a given roll and from roll to roll.

EXAMPLE 9

A series of rolls were made using the method of the present invention and other using a prior art process. A comparison was made of the relative uniformity in the electrolytic resistance characteristics, both from roll-to-roll as well within a given roll.

The procedure used for making the rolls according to the method of the present invention was that described in Examples 1–4. The prior art process used was that described in Examples 5–8.

Figure 2:
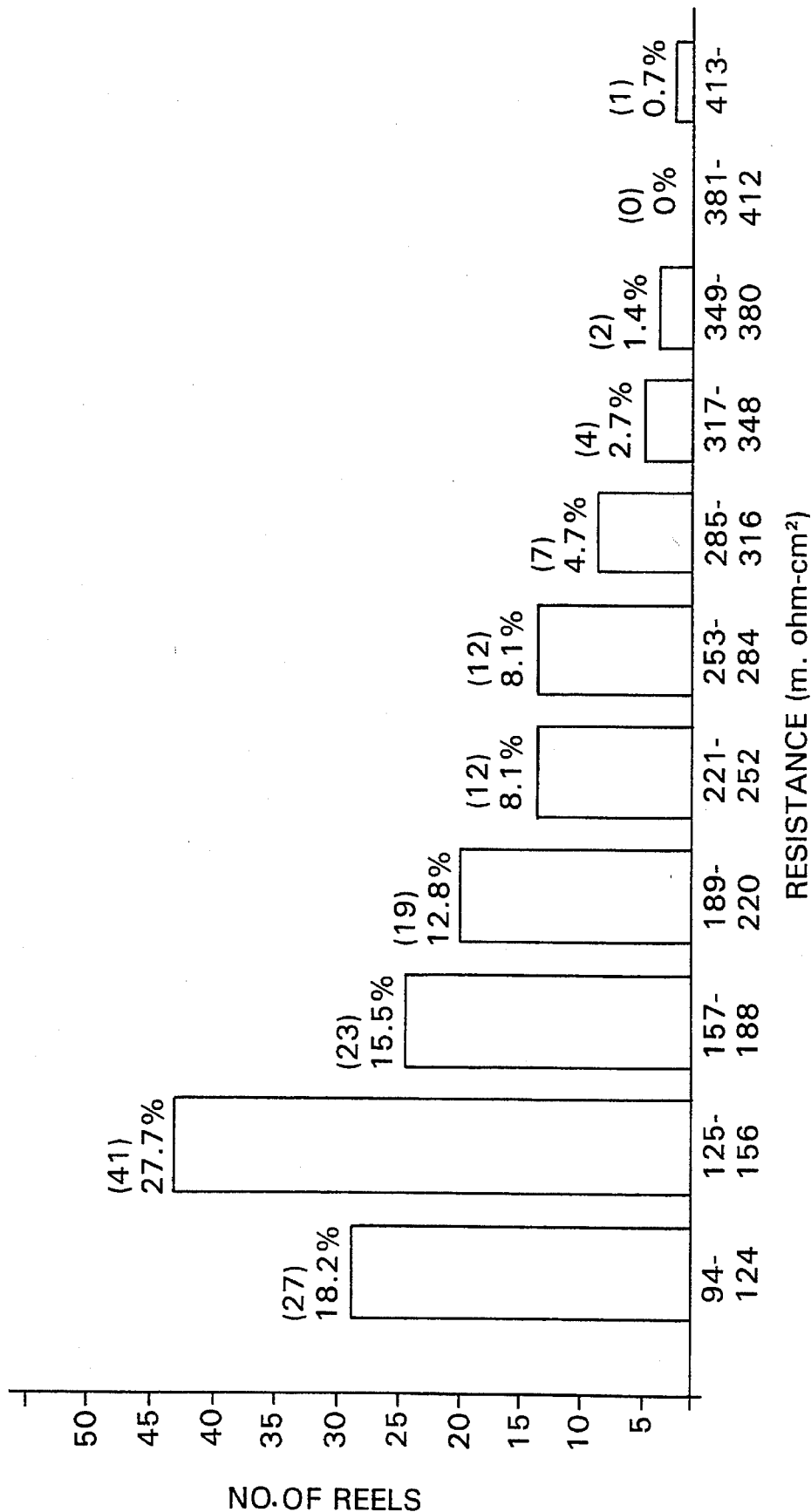
FIG. 2 is a bar graph similar to FIG. 1, except showing the electrolytic resistance distribution characteristics obtained using a prior art method and, FIG. 3 is a graph showing the highly uniform electrolytic resistance distribution characteristics of film made using the method of this invention.

A number of reels were made from the rolls, the electrolytic resistances of the respective reels were then determined, and the ranges plotted in FIGS. 1 and 2. FIG. 1 represents the electrolytic resistance distribution of rolls made in accordance with the method of the present invention. A statistically normal distribution results with about 90% of the reels (i.e., 77 out of 86) having electrolytic resistances falling between 125 to 188 mΩ-cm$^2$. In contrast, the distribution for the electrolytic resistance characteristics of rolls made with the prior art process shows (FIG. 2) a distribution with a long tail tending toward higher resistance values and only about 43% of the reels (i.e., 64 out 147) having resistances falling between 125 to 188 mΩ-cm$^2$.

Figure 3:
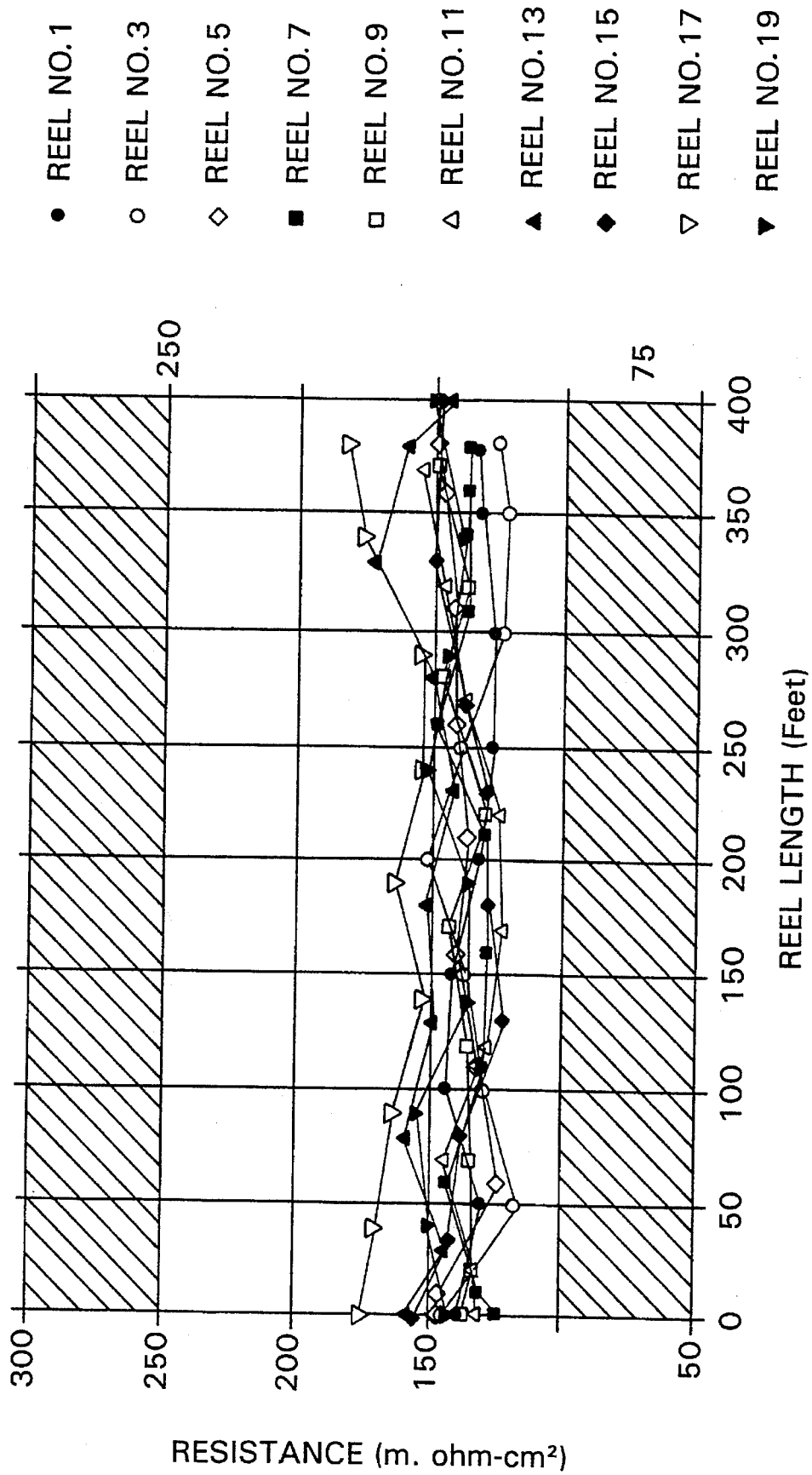

The electrolytic resistance distribution within a given reel is plotted in FIG. 3. FIG. 3 shows the distribution within reels achieved using the present invention which is relatively more uniform in comparison to the respective electrolytic resistances within a reel when using a prior art technique.

The uniformity index for the 10 reels shown in FIG. 3 range from 7.5 to 35. While having acceptable uniformity indices (i.e., 40 to 49), the prior art reels are out of the desired electrolytic resistance range of 100 to 250 mΩ-cm$^2$.

EXAMPLES 10–11

Rolls of battery separator films were made using the present invention and the electrolytic resistance uniformity was measured when composite separator materials were fabricated.

A low density polyethylene crosslinked battery separator film was made following the procedures and using the materials identified in Examples 1–4. After the roll was dried, separators were made by laminating a layer of cellophane (1 mil in thickness) to form a bilaminate.

Another roll was also prepared as in Examples 1–4. After the roll was dried, a trilaminate was formed by utilizing two layers of separator and a cellophane layer positioned in the middle of the trilaminate.

The electrolytic resistances for the rolls were determined as described in Examples 1–4. The results are shown in Table 3:

TABLE 3

| Example | Electrolytic Resistance - mΩ-cm² |
|---|---|
| 10 (bilaminate) | 195,209,232,222,250,208 |
| 11 (trilaminate) | 376,416,381,413,419,376 |

As can be seen, the composite separate materials exhibit highly uniform electrolytic resistance characteristics.

EXAMPLE 12

A battery separator was made showing a composite structure with cellophane and an absorber layer.

A polyethylene crosslinked film roll was made using the procedure and materials set forth in Examples 1–4. After drying, the resulting grafted membrane was first laminated with a cellophane layer (1 mil in thickness) and then an absorber layer (i.e., 4 mils in thickness). The electrolytic resistances of several reels into which the roll was separated were measured. The results are shown in Table 4:

TABLE 4

| | Electrolytic Resistance mΩ-cm² | | | |
|---|---|---|---|---|
| Feet | Reel #1 | Reel #2 | Reel #3 | Reel #4 |
| 0 | 310 | 302 | 243 | 275 |
| 50 | 289 | 277 | 224 | 280 |
| 100 | 292 | 282 | 238 | 274 |
| 150 | 309 | 290 | 228 | 292 |
| 200 | 289 | 272 | 239 | 267 |
| 250 | 289 | 273 | 283 | 267 |
| 300 | 288 | 262 | 273 | 272 |
| 350 | 285 | 265 | 232 | 262 |
| 400 | 279 | 257 | 259 | 261 |
| 450 | 293 | 266 | 283 | 267 |

As can be seen, the uniformity index of these reels (determined from the first 8 samples, viz.—the sample taken at 450 feet being redundant) is excellent, ranging from 15.5 to 29.5.

EXAMPLES 13–15

Battery separator films were made using the procedure and materials set forth in Examples 1–4, except that the last two water washes used hot water and no emulsifier so as to provide battery separators in the intermediate electrolytic resistance range.

Three rolls were made, and the electrolytic resistance was determined as described in Examples 1–4. The results are set forth in Table 5:

TABLE 5

| Example | Electrolytic Resistance - mΩ-cm² |
|---|---|
| 13 | 176,189,224,201,269,265 |
| 14 | 181,193,246,252,247,212 |
| 15 | 222,192,263,247,270,260 |

These rolls exhibited an average electrolytic resistance of 228 mΩ-cm² with a spread of 94 mΩ-cm² between the maximum and minimum values. Such spreads are well within the uniformity index that is achieved when making intermediate range electrolytic resistance battery separator films using the method of the present invention. Here, the uniformity index for the rolls ranged from 13 to 42.

EXAMPLES 16–18

Battery separator films were made using the procedure and materials as set forth in Examples 1–4, except employing a lower level of grafting monomer and wash solutions containing no emulsifier so as to provide lots of battery separator films in the high electrolytic resistance range.

Rolls were prepared using the procedure and materials of Examples 1–4, except that the grafting solution contained 26% methacrylic acid, and the last two tanks of water wash were hot water without any emulsifier.

The electrolytic resistances of these rolls were measured as described in Examples 1–4 and are set forth in Table 6:

TABLE 6

| Example | Electrolytic Resistance - mΩ-cm² |
|---|---|
| 16 | 319,340,270,390,354,339 |
| 17 | 387,408,477,351,331,383 |
| 18 | 320,329,333,363,404,410 |

The average resistance in these rolls was 362 mΩ-cm² with a spread of 207 mΩ-cm² between the maximum and minimum values. The spreads obtained are well within the uniformity index that can be achieved when making high range electrolytic resistance battery separator films using the method of this invention. Here, the uniformity index for the rolls made ranged from 50 to 100.

EXAMPLES 19–21

Battery separator films were made using the general procedure and materials described in Examples 1–4, except that the number of exchanges with nitrogen was increased.

Three rolls were grafted using the procedure set forth in Examples 1–4, except that three exchanges of nitrogen were used. The electrolytic resistances were measured as described in Examples 1–4 and are set forth in Table 7:

TABLE 7

| Example | Electrolytic Resistance - mΩ-cm² |
|---|---|
| 19 | 112,123,124,112,123,144 |
| 20 | 165,122,113,168,156,154 |
| 21 | 107,129,132,148,128,122 |

Enhanced uniformity was provided in comparison to that achieved in Examples 1–4. An average resistance of 132 mΩ-cm² was obtained for these rolls with a spread between the maximum and minimum values of 58 mΩ-cm². It is believed that this enhanced uniformity is due to the increased number of nitrogen exchanges used.

While this invention has been described with an emphasis upon preferred embodiments, it will be obvious to those of ordinary skill in the art that variations in the preferred method and membranes may be made and that it is intended that the invention may be practiced otherwise than as specifically described herein. Accordingly, this invention includes all modifications encompassed within the spirit and scope of the invention as defined by the following claims.

I claim:

1. A lot of a polyethylene film for making separators for alkaline battery applications comprising a crosslinked low density polyethylene film having a thickness of from about 0.5 to about 5 mils and a monomer selected from the group consisting of acrylic and methacrylic acid radiation-grafted to the polyethylene film to an extent selected to satisfy the requirements for the alkaline battery application, said film having an electrolytic resistance in the range of 100 to 250 $m\Omega\text{-}cm^2$ and a uniformity index no more than 50 $m\Omega\text{-}cm^2$ as measured from eight samples taken equidistantly along at least a 100 foot lineal length of said lot of polyethylene film.

2. The lot of claim 1 wherein the uniformity index is no more than 40 $m\Omega\text{-}cm^2$.

3. A lot of a polyethylene film for making separators for alkaline battery applications comprising a crosslinked low density polyethylene film having a thickness of from about 0.5 to about 5 mils and a monomer selected from the group consisting of acrylic and methacrylic acid radiation-grafted to the polyethylene film to an extent selected to satisfy the requirements for the alkaline battery application, said film having an electrolytic resistance in the range of 180 to 260 $m\Omega\text{-}cm^2$ and a uniformity index no more than 70 $m\Omega\text{-}cm^2$ as measured from eight samples taken equidistantly along at least a 100 foot lineal length of said lot of polyethylene film.

4. The lot of claim 3 wherein said uniformity index is no more than 50 $m\Omega\text{-}cm^2$.

5. A lot of a polyethylene film for making separators for alkaline battery applications comprising a crosslinked low density polyethylene film having a thickness of from about 0.5 to about 5 mils and a monomer selected from the group consisting of acrylic and methacrylic acid radiation-grafted to the polyethylene film to an extent selected to satisfy the requirements for the alkaline battery application, said film having an electrolytic resistance in the range of 200 to 500 $m\Omega\text{-}cm^2$ and a uniformity index no more than 140 $m\Omega\text{-}cm^2$ as measured from eight samples taken equidistantly along at least a 100 foot lineal length of said lot of polyethylene film.

6. The lot of claim 5 wherein said uniformity index is no more than 100 $m\Omega\text{-}cm^2$.

7. A lot of a composite bilaminate for making separators for alkaline battery applications comprising a crosslinked low density polyethylene having a thickness of from about 0.5 to about 5 mils and a monomer selected from the group consisting of acrylic and methacrylic acid radiation-grafted to the polyethylene film to an extent selected to satisfy the requirements for the alkaline battery application, and a cellophane layer laminated to said polyethylene film, said lot having an electrolytic resistance in the range of 160 to 310 $m\Omega\text{-}cm^2$ and a uniformity index of no more than 70 $m\Omega\text{-}cm^2$ as measured from eight samples taken equidistantly along at least a 100 foot lineal length of said lot of composite bilaminate.

8. The lot of claim 7 wherein said uniformity index is no more than 50 $m\Omega\text{-}cm^2$.

9. A lot of a composite trilaminate for making separators for alkaline battery applications comprising a crosslinked low density polyethylene film having a thickness of from about 0.5 to about 5 mils and a monomer selected from the group consisting of acrylic and methacrylic acid radiation-grafted to the polyethylene film to an extent selected to satisfy the requirements for the alkaline battery application, a central layer of cellophane laminated to outer layers of said polyethylene film, said lot having an electrolytic resistance in the range of 260 to 560 $m\Omega\text{-}cm^2$ and a uniformity index of no more than 90 $m\Omega\text{-}cm^2$ as measured from eight samples taken equidistantly along at least a 100 foot lineal length of said lot of composite trilaminate.

10. The lot of claim 9 wherein said uniformity index is no more than 70 $m\Omega\text{-}cm^2$.

* * * * *